A. M. BEEBE.
Whiffletree.
No. 36,638 — Patented Oct. 14, 1862.
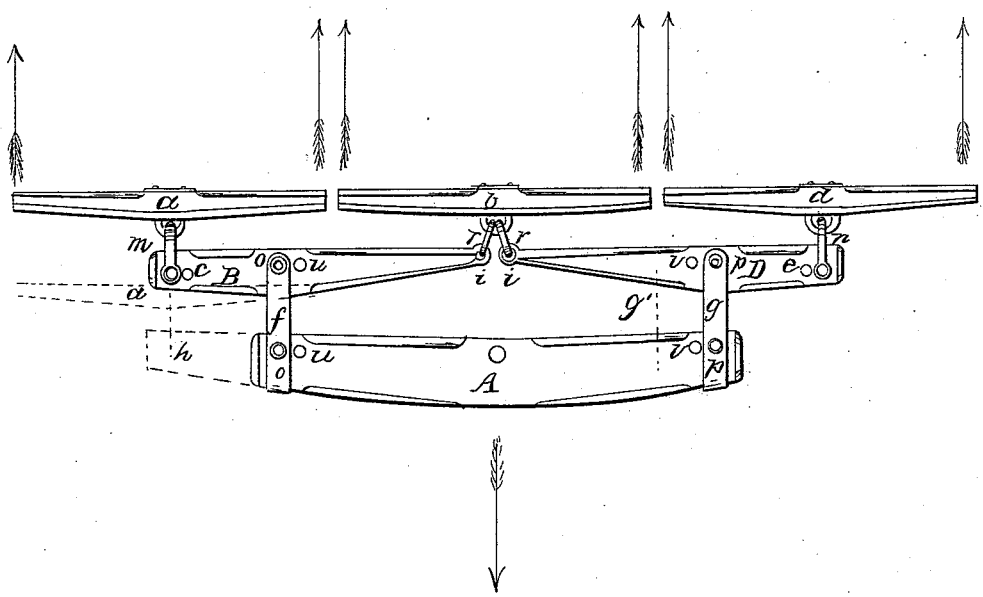

UNITED STATES PATENT OFFICE.

A. M. BEEBE, OF WEST BLOOMFIELD, NEW YORK.

IMPROVEMENT IN WHIFFLETREES.

Specification forming part of Letters Patent No. 36,638, dated October 14, 1862.

*To all whom it may concern:*

Be it known that I, A. M. BEEBE, of West Bloomfield, in the county of Ontario and State of New York, have invented a new and useful System of Whiffletrees and Eveners for Three Horses; and I do hereby declare that the following is a full, clear, and exact description thereof, reference being had to the annexed drawing, making a part of this specification.

The drawing is a plan or top view of the invention.

This invention consists in the combination and arrangement of three equalizing eveners with the three whiffletrees in a system for three horses when driven abreast, in such a manner as to place the whiffletrees exactly on a line with each other, which allows the tugs of all the horses to be of equal length, and affords each horse an even central draft.

To enable others to make and use my invention, I will proceed to describe its construction and operation.

The three whiffletrees *a*, *b*, and *d* are made of proper length, and they may be "ironed" in any desirable style. *a* and *d* are attached to the two short auxiliary eveners B and D by the clevises *m* and *n*, and *b* is attached to the inner end of each of the auxiliary eveners B and D by the links *r*, the latter being permanently connected with the eveners by the clasps *i*, which are riveted to the ends of the eveners; or this whiffletree may be connected similar to the others by two clevises, whereby it may be removed at any time, if desired. The principal or long evener A is connected to the short ones B and D by means of the clevises *f* and *g* and the bolts *o* and *p*. This system of whiffletrees and eveners is applicable to a plow, drag, stone-boat, or for any other heavy teaming where three horses are driven abreast, even on a wagon, by substituting a pair of tongues for the single one.

When it is desirous to give one horse the advantage, he should be placed in the center, and the two outer whiffletrees, *a* and *d*, should be moved in by removing the bolts from the clevises *m* and *n* and placing them in the holes *c* and *e*; or, if it is desired to work one horse against the other two the whiffletrees *a* and *d* are left as shown in the drawing, and the clevises *f* and *g* are moved in, the bolts *o* being placed in the holes *u* and the bolts *p* in the holes *v*. The relative proportion of this advantage in either case may be increased or diminished by having several extra holes in the eveners for that purpose.

The red dotted lines *h* represent the long end of the evener A in the ordinary arrangement of three-horse eveners, and the red dotted lines *a'* the relative position of the whiffletree *a* in such arrangement, showing that the tugs of the near horse must be much longer than those of the other two, the difference being ten or twelve inches, in order to bring his head on a line with theirs, and this extra length of the tugs is very objectionable, particularly in plowing, dragging, &c., because, in turning about, they drop to the ground and the horse travels out of them, causing much trouble at every turn, whereas with my arrangement, the whiffletrees all being on a line, one horse is no more liable to "get out of his tugs" than either of the others.

The red dotted lines *g'* indicate where the clevis *g* would be located in the old arrangement.

What I claim as my invention, and desire to secure by Letters Patent, is—

The combination and arrangement of the equalizing eveners A, B, and D with the whiffletrees *a*, *b*, and *d* for three-horse teams, substantially in the manner specified.

A. M. BEEBE.

Witnesses:
  WM. S. LOUGHBOROUGH,
  LOUIS ERNST.